United States Patent
Chauveau et al.

(10) Patent No.: US 11,300,980 B2
(45) Date of Patent: Apr. 12, 2022

(54) DEVICE FORMING A TIMER-OPERATED TAP OR A TIMER CARTRIDGE FOR A TIMER-OPERATED TAP

(71) Applicant: LES ROBINETS PRESTO, Montrouge (FR)

(72) Inventors: Stéphane Chauveau, Saint-Georges-de-Didonne (FR); Grégory Bacquet, Saint-Georges-de-Didonne (FR); Laurent Granseigne, Saint-Georges-de-Didonne (FR)

(73) Assignee: LES ROBINETS PRESTO, Montrouge (FR)

( * ) Notice: Subject to any disclaimer, the term of this patent is extended or adjusted under 35 U.S.C. 154(b) by 80 days.

(21) Appl. No.: 16/650,469

(22) PCT Filed: Sep. 21, 2018

(86) PCT No.: PCT/EP2018/075666
§ 371 (c)(1),
(2) Date: Mar. 25, 2020

(87) PCT Pub. No.: WO2019/063441
PCT Pub. Date: Apr. 4, 2019

(65) Prior Publication Data
US 2021/0208612 A1    Jul. 8, 2021

(30) Foreign Application Priority Data

Sep. 28, 2017 (FR) .................................. FR 17 71030

(51) Int. Cl.
*G05D 7/01* (2006.01)
*E03C 1/04* (2006.01)

(52) U.S. Cl.
CPC ............. *G05D 7/0133* (2013.01); *E03C 1/04* (2013.01); *Y10T 137/86389* (2015.04)

(58) Field of Classification Search
CPC . Y10T 137/86389; G05D 7/0133; E03C 1/04; F16K 47/011; F16K 47/0111;
(Continued)

(56) References Cited

U.S. PATENT DOCUMENTS

| | | | | |
|---|---|---|---|---|
| 753,964 A | * | 3/1904 | Douenne .................. | E03D 3/06 251/18 |
| 2,181,581 A | * | 11/1939 | Fraser ..................... | F16K 21/10 137/244 |

(Continued)

FOREIGN PATENT DOCUMENTS

| | | | |
|---|---|---|---|
| DE | 296 08 014 U1 | 10/1996 | ............. F16K 21/06 |
| EP | 0 928 918 A1 | 7/1999 | ............. F16K 21/10 |
| WO | WO 2015/043080 A1 | 4/2015 | ............. F16K 21/04 |

OTHER PUBLICATIONS

Machine Translation of EP0928918A1 obtained from espacenet.com on Aug. 13, 2021 (Year: 2021).*

(Continued)

*Primary Examiner* — Jessica Cahill
(74) *Attorney, Agent, or Firm* — Renner, Kenner, Greive, Bobak, Taylor & Weber

(57) ABSTRACT

A timer-operated tap or timer cartridge for a device forming a timer-operated tap includes at least one opening for the inlet of the supply fluid and at least one opening for the outlet of the supply fluid. A main closure member is received in a main seat formed in at least one outlet or inlet opening to close the tap and is removed from the main seat to open the tap and allow the passage of the supply fluid between the inlet and outlet openings. Control means for controlling the movement of the main closure member by means of a control rod; and timer means intended for moving the main (Continued)

closure member into the seat thereof at the end of a given time interval preceding the removal thereof. An element forming an intermediate closure member and an associated intermediate seat may also be provided.

16 Claims, 4 Drawing Sheets

(58) Field of Classification Search
CPC ........ F16K 47/00; F16K 47/02; F16K 47/023; F16K 21/06
See application file for complete search history.

(56) References Cited

U.S. PATENT DOCUMENTS

| | | | | |
|---|---|---|---|---|
| 2,710,736 A * | 6/1955 | Miller | ............ | F16K 21/10 251/51 |
| 3,376,013 A | 4/1968 | Mallett | | |
| 3,902,521 A * | 9/1975 | Keller | ............ | F16K 47/02 137/375 |
| 4,819,909 A | 4/1989 | Hart et al. | ............ | F16K 21/06 |
| 4,934,651 A * | 6/1990 | Nowicki | ............ | F16K 21/04 251/30.04 |
| 4,973,025 A | 11/1990 | Iqbal | ............ | F16K 21/06 |
| 9,267,608 B2 * | 2/2016 | Dutheil | ............ | F16K 21/10 |
| 2009/0242819 A1 * | 10/2009 | Gao | ............ | E03C 1/04 251/323 |
| 2010/0163764 A1 * | 7/2010 | Collins | ............ | F16K 21/10 251/58 |

OTHER PUBLICATIONS

International Search Report dated Dec. 20, 2018 in related application No. PCT/EP2018/075666.

* cited by examiner

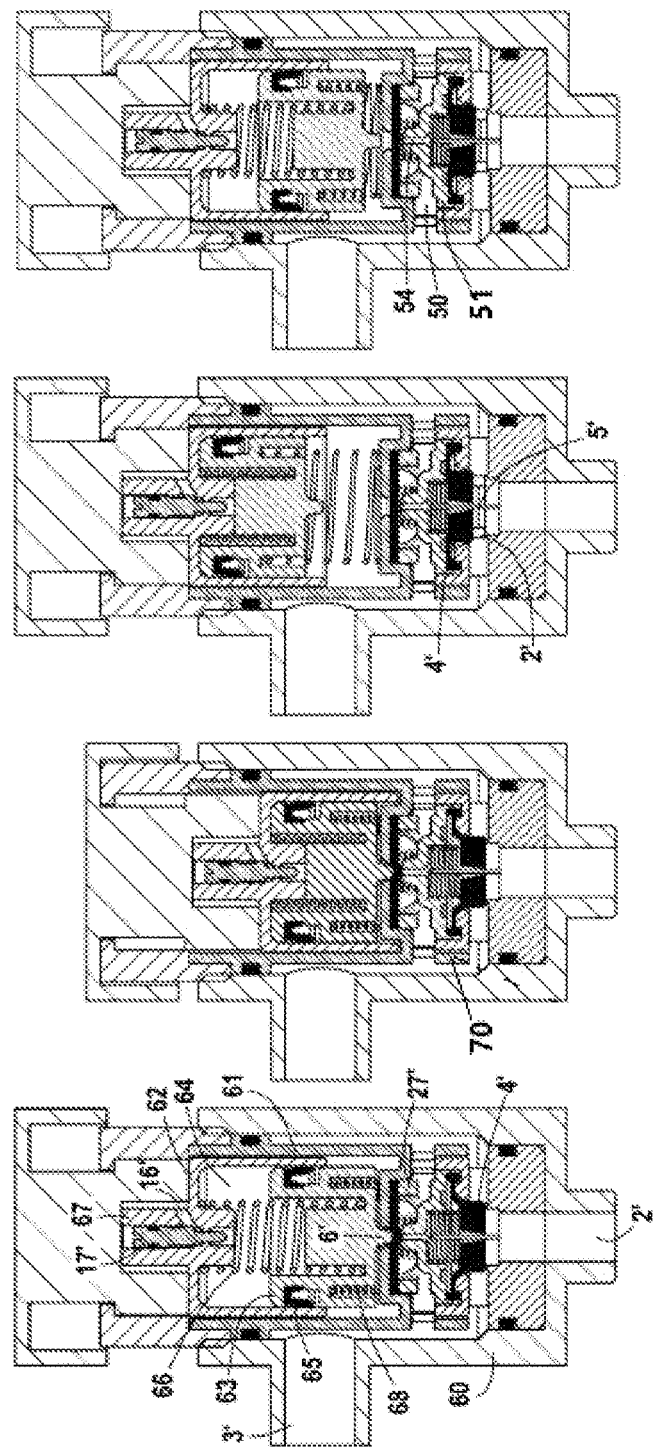

DEVICE FORMING A TIMER-OPERATED TAP OR A TIMER CARTRIDGE FOR A TIMER-OPERATED TAP

CROSS-REFERENCE TO RELATED APPLICATION

This is a § 371 application of International patent application number PCT/EP2018/075666 filed Sep. 21, 2018, and French application FR 17 71030 filed Sep. 28, 2017.

TECHNICAL FIELD

The present invention relates to a timer cartridge for a device forming a timer-operated tap, especially for use in frequently used public places or communities such as schools or hospitals.

BACKGROUND ART

Conventionally, a timer cartridge or a timer-operated tap comprises a closure member received in a seat; actuating means comprising a rod, which, when displaced, causes the closure member to leave the seat to allow a supply fluid, particularly water, particularly cold or hot water, to pass through a water supply pipe to a water outlet pipe; and timing means intended to ensure that the closure member returns to its seat at the end of a preset time interval.

Conventional timing means entail taking a small portion of the supply fluid flow, especially water, in the tap open mode to gradually fill a timer chamber, filling of the timer chamber having the effect of returning the closure member to its seat in the closed position of the tap.

Although this timing technique gives satisfactory results, it is dependent on the pressure and temperature of the supply fluid, especially water, especially in the supply pipe from the network, and thus the network pressure, and the cleanliness and temperature of the water supplied by the network. In addition, for the tap to open, whether manually or electronically, considerable force needs to be used to force the water from the timing chamber, which either implies fatigue for the user in the case of manual opening, for example by pressing a pushbutton, or high costs and stresses in the case of an electronic device.

SUMMARY OF THE INVENTION

The present invention seeks to overcome the disadvantages of the prior art by proposing a device forming a timer-operated tap, which can, on the one hand, be opened without the need to apply considerable force, and especially also without the force required, and thus the timing duration, varying as a function of the water pressure in the supply network, the water temperature or the water cleanliness.

According to the invention, a device forming a timer-operated tap or a timer cartridge for a device forming a timer-operated tap is as defined in claim 1, with preferred embodiments and developments being defined in the dependent claims.

By thus providing an intermediate closure member on which an independent supply fluid timing device works, and specifically where the supply fluid does not act on the timing device for the intermediate closure member, while providing synchronisation with the main closure member, it is advantageously possible to ensure that the tap timing device is no longer dependent on the supply fluid. As a result, the tap operates in a more stable manner, especially in relation to variations in the outside temperature from the temperature of the fluid supplied by the network. By the same token, the timing duration is stabilised.

Synchronisation of the main and intermediate closure members is preferably arranged such that, when the intermediate closure member is in its intermediate seat, the main closure member is also in its main seat and, when the intermediate closure member is not in its intermediate seat, the main closure member is not in its main seat either.

According to a preferred embodiment of the invention, the timer means comprise a main timer chamber that affects the displacement of the control rod, the timer chamber being filled with a timer fluid, especially a different fluid to the supply fluid, for example, air.

As a result, to make the main closure member leave the seat, the user only has to apply a small amount of force as required to discharge the timer fluid, for example, air, out of the tap, air having a lower viscosity and being less dependent on temperature than the supply fluid. For example, if a pushbutton is used to control the displacement of the rod, the user can open the tap without any force. In addition, in the case of air, this is an easy fluid to use since it is already present by default in all components.

According to an interesting embodiment of the invention, the intermediate closure member forms an integral part of the control rod and the arrangement is such that displacement of the rod, also referred to as a plunger, in one direction by the control means causes the main closure member to be removed from the seat in a different direction, especially opposite the direction of displacement of the plunger.

According to another particularly preferred embodiment, the intermediate closure member consists of a flexible membrane, especially made from an elastomer material, the actuating rod pushing the membrane into the intermediate seat so that the main closure member is also pushed into the main seat and the rod moves away from and leaves its mechanical connection with the membrane to release it, causing it to leave its intermediate seat and by the same token causing the main closure member to leave its main seat.

According to a preferred embodiment of the invention, an intermediate discharge chamber is provided, said chamber being able to fill with supply fluid between the two closure members, the synchronisation arrangement being such that, when the two main and intermediate closure members are received in their respective seat, the intermediate discharge chamber is empty or substantially empty and, when the two intermediate and main closure members have left their respective seat, the intermediate discharge chamber is filled with supply fluid.

Thus, the supply fluid is only responsible for synchronisation between the two closure members, but not for timing the closure members, and in particular the passage of the supply fluid.

According to a preferred embodiment of the invention, the main seat of the main closure member is arranged axially in relation to the tap, while the other inlet-outlet opening is arranged radially.

According to a preferred embodiment of the invention, the axial opening is the water inlet opening, while the water outlet opening or openings is/are arranged radially.

Displacement of the control rod to control the passage of the closure member out of its seat is preferably achieved by pushing towards the closure member.

According to a preferred embodiment of the invention, the timer chamber is supplied by a timer fluid admission channel, the cross-section of which can be controlled by means of an adjustment screw.

According to a development of the invention, non-return evacuation means are provided for the timer fluid in the timer chamber, especially a lip seal.

The axes of the two main and intermediate closure members in relation to their respective seat are preferably parallel, especially vertical.

The two closure members are preferably displaced in relation to their seat not only along the same axis, but also in the same direction.

By way of example, preferred embodiments of the invention will now be described with reference to the drawings in which:

BRIEF DESCRIPTION OF THE DRAWINGS

FIGS. 3A to 3D show the timer cartridge from FIG. 3 in different positions to illustrate its operation.

DETAILED DESCRIPTION OF THE INVENTION

Figure 1:
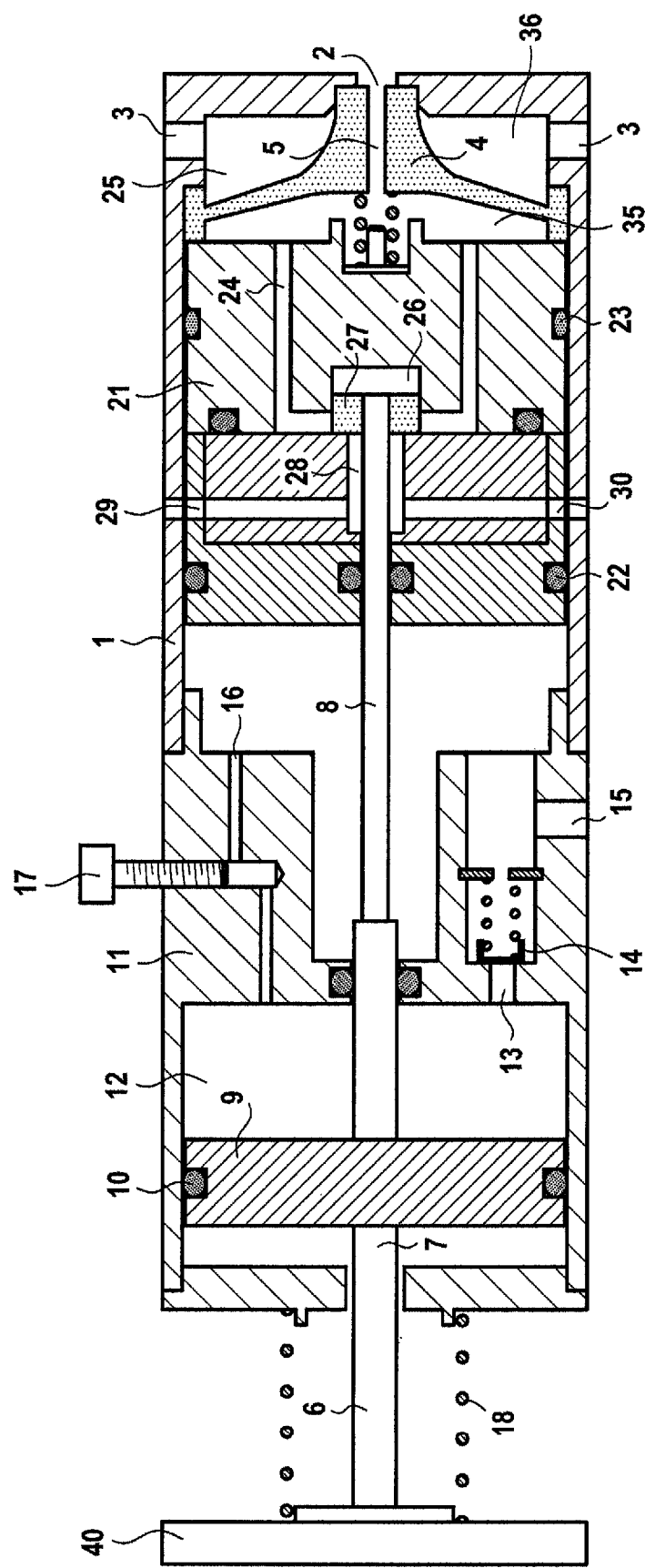
FIG. 1 shows a view in longitudinal section of a timer cartridge according to a first embodiment of the invention.

In FIG. 1, the timer cartridge shown comprises a main body 1, with a substantially cylindrical tubular form comprising at its lower extremity a water inlet or supply opening 2, radial water outlet openings 3 also being arranged on the lower portion of the tap. A main closure member 4 in the form of a membrane comprising a lock wire 5 is received in the main seat formed in the opening 2.

A plunger 6 forming an integral part of a pushbutton 40 is arranged to extend to the inside of the body 1. The plunger 6 forms an integral part of a plate 9 through which it passes. The plate 9 can slide along the internal wall of the body 1 in a leaktight manner at the level of its interface with the wall 1 by means of an O-ring seal 10. The plate 9 and a block 11 define a timer chamber 12 in which air is received.

A channel 13 for the passage of air is formed in the block 11 and sealed by means of a non-return flap 14. A channel 15 connects the outlet from the flap 14 and the outside. A channel 16 referred to as a timer channel or path is also formed in the block 11, wherein its cross-section can be modified by means of a timer adjustment screw 17. The channel 16 leads into the chamber 12 on the one hand and on the other hand is connected to the air intake channel 15.

A return spring 18 causes the pushbutton 40 to go back up once the user has released the pressure on the pushbutton.

In the lower portion of the tap, above the area in which the main closure member 4 in the form of a membrane is located, a lower internal block 21, which is fixed to the wall of the tap body 1, is arranged. This block is fixed to the wall of the body 1 in a leaktight manner with interposed O-ring seals 22 and 23. A plurality of channels are formed in this block 21. The block 21 comprises a channel 24 in annular form emerging at its lower part in a chamber 25 in which the membrane 4 is received, and, at its upper part, in a chamber 26, in which is received an intermediate closure member 27 forming an integral part of the lower extremity of the plunger 6. The plunger 6 partially passes through the block 21 in a vertical channel 28 emerging above the chamber 26. Two horizontal channels 29 and 30 extend in the block 21 between the vertical channel 28 and the outside of the tap.

The membrane forming the main closure member divides the chamber 25 into two compartments, notably an upper compartment 35 and a lower compartment 36.

The cartridge or the tap comprising the cartridge operates in the following manner.

Figure 2C:
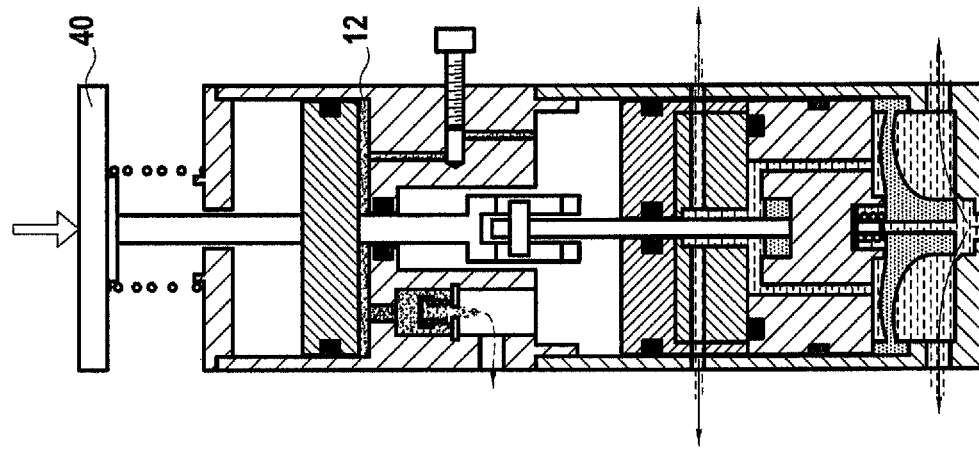
FIGS. 2A to 2F show the cartridge in FIG. 1 in different positions to illustrate its operation.
Figure 2B:
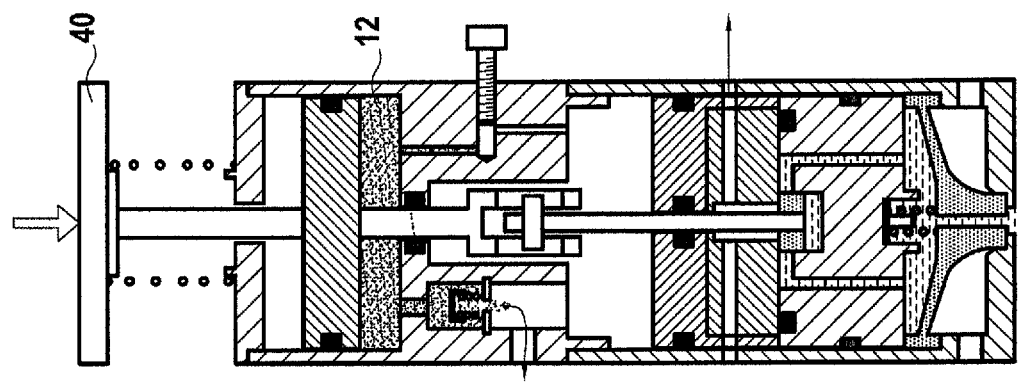
Figure 2A:
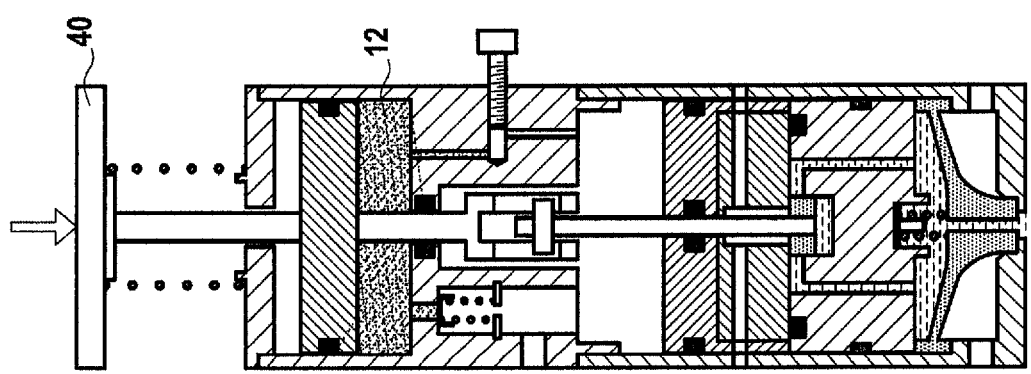
Figure 2F:
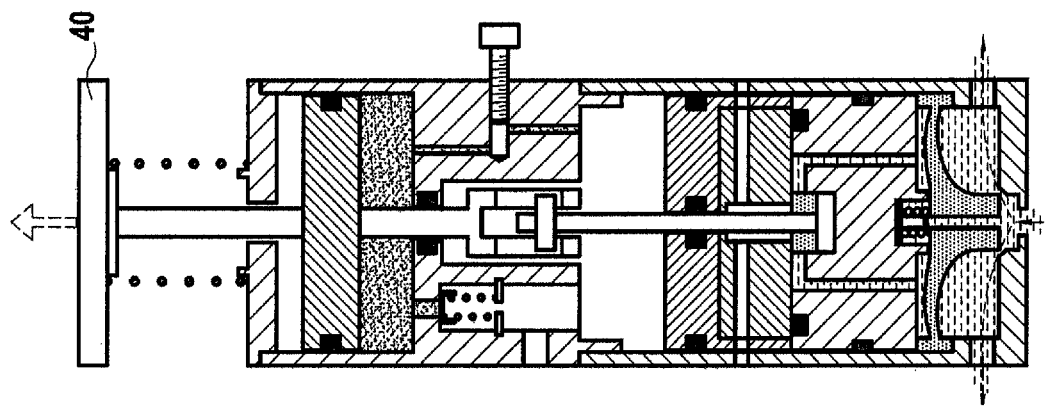
Figure 2E:
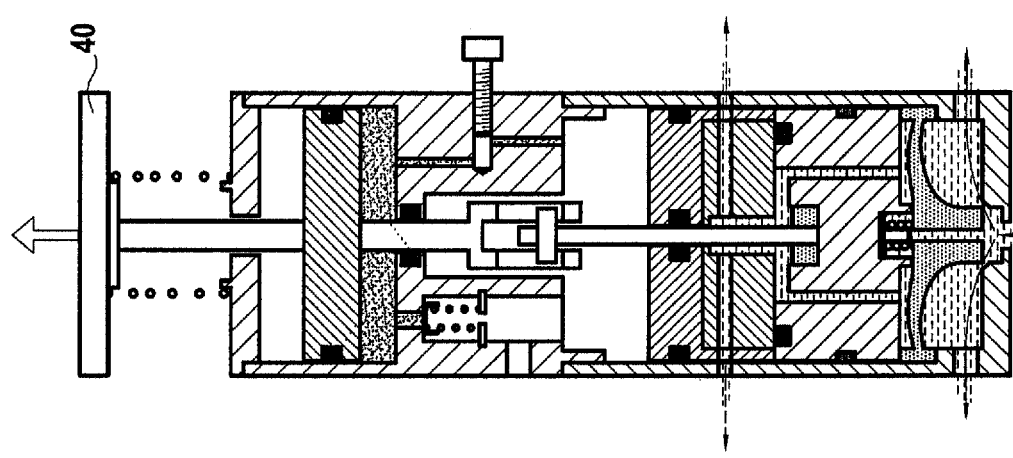
Figure 2D:
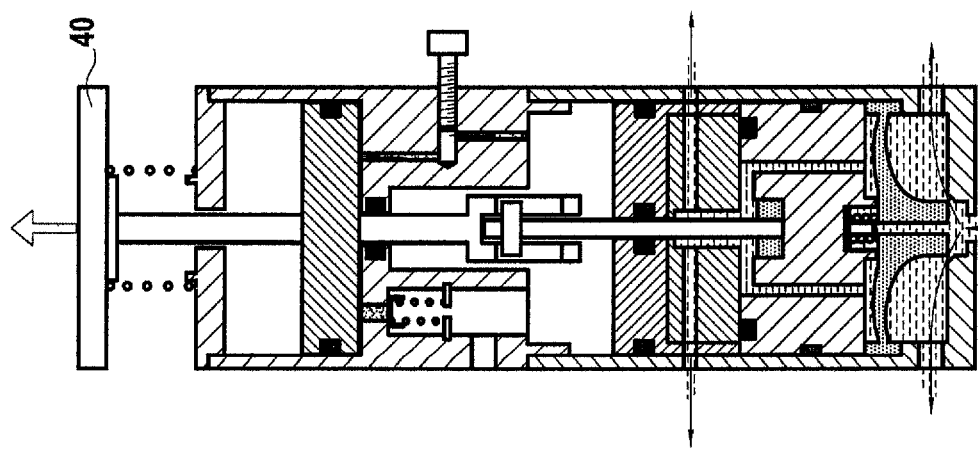

From the position shown in FIG. 2A, in which the tap is in the closed state, the membrane 4 resting in its seat in the axial opening 2 to thus prevent water from the network passing from the opening 2 to the radial outlet openings 3, the user presses the pushbutton 40. This has the effect of pressing the plate 9 towards the block 11 by means of the plunger and expelling air from the timer chamber 12 to the outside by means of the channel 13, the non-return flap 14 and the outlet channel 15. At the same time, the plunger 6 forming an integral part of the plate 9 comes down and presses the intermediate closure member 27 to the bottom of the intermediate chamber 26. As a result, the intermediate closure member 27 leaves its intermediate seat and allows water from the compartment 36 in the chamber 25 to pass through the annular channel 24, the vertical channel 28 and the horizontal channels 29 and 30 to discharge to the outside. Thus, the supply fluid, water in this case, which remains in suspension in the upper compartment 35 of the chamber 25, i.e. on the opposite side to the opening 2, and which maintains the membrane 4 in its seat under pressure, discharges to the outside. As a result, the membrane 4 is no longer subjected to pressure from above and, under the effect of fluid from the network, leaves its seat in the opening 2 and moves upwards. It thus opens the opening 2 and allows the supply fluid to pass between the axial opening 2 and the radial openings 3 to thus allow the tap 5 to move into an open position in which the two closure members 4 and 27 have left their respective seat.

When the user stops pressing the button 40, the return spring 18 tends to return the plunger 6 to the top. In addition, air passes through the orifice 15 in the channel 16 towards the chamber 12 passing through the adjustment screw 17, which adjusts the return air flow to the chamber 12. When the chamber 12 is completely filled with air again, this also causes the rod 8 to return to the top such that the intermediate closure member 27 is once again positioned in its seat away from the bottom of the chamber 26. Water then fills the channels 24 and the upper compartment 35 of the chamber 25 above the membrane 4 by means of the lock wire 5 until this is pushed back against the seat 2.

The device is then back in the starting position, notably a position in which the tap is closed, in which the two closure members 4 and 27 are in their respective seats.

Thus, as can be seen, the user can easily press the pushbutton 40 to open the tap, only a small amount of force being required to expel the air from the compartment 12. However, at the same time, the membrane 4 is held in the closed position by a much larger force than the small force required to open it, with the water in the compartment 35 exerting a pressure on the membrane 4 which is much stronger than the pressure exerted by the air on the plate 9. Thus, compared with the prior art, the functions of the fluids, timing and supply respectively, have therefore been separated, each fluid having its own function, wherein one, namely air, which is driven into the atmosphere, serves to open the tap, while the other, water, is used to press against the membrane to prevent leaks when the tap is in the closed position. In addition, the time taken for the timer chamber to fill is now subject to very little variation as a function of the outside temperature to which the tap is subject, since the viscosity of the air, which is the factor determining the time taken to fill the chamber through the cross-section of the channel 16, only varies very slightly as a function of temperature.

For example, at the standard pressure of 1 atm, air has a dynamic viscosity of 0.0168 mPa·s at −10° C., 0.01786 mPa·s at 0° C. and 0.0198 mPa·s at 50° C., whereas water has a dynamic viscosity of 1.308 mPa·s at 10° C. and 0.54 mPa·s at 50° C.

The embodiment described above comprises a pushbutton. This could be replaced by a pivoting handle or any other mechanical control means.

Furthermore, the above description relates to a timer-operated tap in which the passage of supply fluid takes place as soon as the closure member has left its seat, whether or not the user continues to actuate the control means, for example, continues to press the pushbutton. While remaining within the scope of the invention, additional means that are conventional in the field can be provided to prevent the supply fluid passing through as long as the user continues to actuate the control means, for example continues to press the pushbutton, wherein the passage of fluid between the inlet and outlet openings is only able to take place once the user stops applying their respective action to the control means.

In general terms, fluid viscosity, especially dynamic viscosity, is determined at ambient temperature, especially at 20° C., for comparison purposes. This is measured using a conventional viscometer.

According to a development of the invention, means can be provided to control the forced opening of the non-return flap, which causes the pneumatic chamber to fill instantaneously, and thus cancels the time delay and leads to the immediate or virtually immediate closure of the tap.

FIGS. 3A to 3D show a timer cartridge according to another embodiment of the invention.

The timer cartridge shown comprises a main body 60 which is substantially circular-cylindrical. The main body 60 comprises a water inlet or supply opening 2' at its lower end, radial outlet openings 3' also being arranged on the lower portion of the body. The main body 4' in the form of a membrane comprising a lock wire 5' is received in a seat formed in the opening 2'.

A first substantially circular-cylindrical or tubular upper block 61 is received in the upper portion of the main body 60, an upper tubular element 62 being arranged in said block, said upper element being open at the bottom and able to slide in the vertical direction inside the first block 61, and a lower tubular element 63 also being arranged in said block, said lower element being able to slide in the upper tubular element 62 along its lower wall so as to define a timer chamber 64 between the two elements with a volume that varies as a function of the relative sliding of the two elements 62 and 63. A flap in the form of a lip seal 65 arranged between the two elements and forming an integral part of the lower element 63 ensures that the chamber 64 is leaktight when it is full and allows it to be drained when the air is pushed downwards.

A push element 67 extends from the upper wall of the upper element 62, passing through the upper wall of the block 60 and protruding outside the main body.

An upper spring 66 rests between the upper wall of the element 62 and the bottom wall of the lower element 63. When the chamber 64 is at its maximum volume (FIG. 3A), the spring is in the uncompressed or resting state.

A lower spring 68 rests between the bottom wall of the lower element 63 and the bottom wall of the block 61. When the chamber 64 is at its maximum volume (FIG. 3A), the spring is in the compressed state.

A plunger 6' extends from the bottom wall of the lower tubular element 63 and passes through the bottom wall of the block 61. A membrane 27', particularly made from an impermeable elastomer material, is arranged opposite the hole through which the plunger 6' passes in the bottom wall of the block 61, and is pressed against the lower face of the block 61. It could, although this is not essential, be fixed, for example by welding, gluing or similar means, along its peripheral edge to the lower face of the block 61. When the plunger 6' is pushed out of the block 61, it comes up against the membrane 27' and displaces its central portion from the bottom wall of the block 61.

A lower block 70 with a substantially cylindrical shape, defining the supply fluid inlets and outlets and the main seat of the closing member 4', is also arranged in the main body 60 of the cartridge.

An internal space 50 in which an annular element 51 is received is formed between the two upper and lower blocks, said space comprising a vertical central channel 54 passing through from one end to the other. The internal space 50 is divided, by interposing the annular element 51, into two sub-spaces, an upper and a lower sub-space respectively, which communicate via the central channel 54 to allow fluids through. The upper outlet of the vertical channel 54 is opposite the central portion of the membrane 27' and the plunger 6'.

The cartridge in FIGS. 3A to 3D operates as follows:

In the position shown in FIG. 3A, the main closure member or membrane 4' is in its seat and prevents the supply fluid passing through from the inlet opening to the side outlet openings. The timer chamber 64 is filled with timer fluid (air in this case) such that the plunger 6' is kept at the bottom and presses the membrane 27' against the edge of the upper opening of the channel 54, thus preventing the supply fluid present in the lower sub-space from passing into the upper sub-space of the space 50 despite the pressure of the fluid at the inlet 2'. The lower sub-space is completely filled with supply fluid via the lock wire 5', the pressure of the fluid pressing the membrane 4' into its seat. The push element 67 is not pressed downwards and protrudes outside the main body 60 and the block 61.

The force of the spring 66 contained in the main timer chamber 64 is higher than the force exerted by the compressed spring 68.

In FIG. 3B, the user has pressed the push element 67. The air contained in the timer chamber 64 is driven downwards to the level of the lower peripheral extremity of the lip seal 65, then returned upwards along the side walls between the walls of the upper block 61 and the wall of the tubular element 62 before emerging through the upper opening in the block 61. The timer chamber 64, which is initially filled with air, is now empty and the upper spring 66 is compressed due to the user's pushing action. The plunger 6' continues to press on the membrane 27'. Thus, as long as the user keeps the pressure on the push element 67, the tap remains closed, since it can only be opened to allow the supply fluid to pass through once the pressure on the element 67 has been released.

In FIG. 3C, the user has released the pressure on the push element 67. Since the compressed lower spring 68 is no longer opposed by the force of the spring 66 (which remains compressed due to the low pressure in the timer chamber) in the chamber 64 to be supported, this causes the two upper and lower tubular elements 62 and 63 to rise and, as a result, causes the plunger 6' to rise and thus cease to be in contact with the membrane 27'. This results in a rise in the central portion of the membrane 27' and causes the channel 54 to open at the top. The supply fluid, which was previously blocked at the outlet from the channel 54, can pass into the upper sub-space and exit via the side outlets in this sub-space. This leads to a reduction in the pressure exerted by the water in the lower sub-space on the main membrane 4', which rises under the effect of the water entering via the inlet 2' and allows the supply fluid (water) to pass through towards the side outlets 3'. At the same time, the upper spring 66 has been compressed and the chamber 64 remains empty.

However, air starts to enter again at the top via the appropriate flap orifices 16' formed in the push element 67, said orifices having a cross-section that can be adjusted by an adjustment rod 17'.

As the air or timer fluid fills the chamber 64 again, the lower tubular element 63, under the effect of air pressure and the compressed upper spring 66, falls again, taking with it the plunger 6' (FIG. 3D) until said plunger presses the membrane 27' against the edge of the outlet from the channel 54, which has the effect of increasing the pressure in the upper portion of the main membrane and thus again pressing the main membrane 4' back into its seat to block the passage of water between the inlet 2' and the outlets 3' (FIG. 3A).

In FIGS. 3C and 3D, it is possible to see that the supply fluid (water) exits towards the top, after being merged with water exiting from the upper sub-space.

The invention claimed is:

1. Device forming a timer-operated tap or timer cartridge for a device forming a timer-operated tap, comprising at least one inlet opening for supply fluid and at least one outlet opening for supply fluid; a main closure member being capable of being received in a main seat formed in one of the at least one outlet or inlet openings to close the tap and of being removed from the main seat in order to open the tap and allow the passage of the supply fluid between the inlet and outlet openings; control means comprising a push element to control the movement of the main closure member by means of a control rod; and timer means disposed such that the main closure member is moved into the main seat at the end of a preset time interval, an element forming an intermediate closure member and an associated intermediate seat also being provided, the arrangement of the device being such that the supply fluid passes from the at least one inlet opening to the at least one outlet opening through two paths, a first path passing only through the main seat and a second path passing through the main seat and the intermediate seat, and such that, as long as a user keeps pressure on the push element, the tap remains closed, since the tap can only be opened to allow the supply fluid to pass after releasing the pressure on the push element.

2. Device forming a timer-operated tap or timer cartridge for a device forming a timer-operated tap according to claim 1, characterised in that the timer means comprise a main timer chamber that affects displacement of the control rod, the timer chamber being filled with a timer fluid.

3. Device forming a timer-operated tap or timer cartridge for a device forming a timer-operated tap according to claim 2, characterized in that non-return evacuation means are provided for the timer fluid in the timer chamber.

4. Device forming a timer-operated tap or timer cartridge for a device forming a timer-operated tap according to claim 3, characterized in that the non-return evacuation means are a lip seal.

5. Device forming a timer-operated tap or timer cartridge for a device forming a timer-operated tap according to claim 2, characterised in that the timer fluid is air.

6. Device forming a timer operated tap or timer cartridge for a device forming a timer-operated tap according to claim 1, characterised in that an intermediate discharge chamber is provided, said chamber being able to fill with supply fluid between the main closure member and the intermediate closure member, the arrangement of the device being such that, when the main and intermediate closure members are received in their respective seat, the intermediate discharge chamber is empty or substantially empty and, when the intermediate and main closure members have left their respective seat, the intermediate discharge chamber is filled with supply fluid.

7. Device forming a timer-operated tap or timer cartridge for a device forming a timer-operated tap according to claim 1, characterised in that one of the at least one outlet or inlet openings receiving the main seat of the main closure member is arranged axially in relation to the tap, while the other one of the at least one outlet or inlet openings is arranged radially in relation to the tap.

8. Device forming a timer-operated tap or timer cartridge for a device forming a timer-operated tap according to claim 7, characterised in that the one of the at least one outlet or inlet openings arranged axially is the inlet opening, while the outlet opening or openings is/are arranged radially.

9. Device forming a timer-operated tap or timer cartridge for a device forming a timer-operated tap according to claim 1, characterized in that displacement of the control rod to control the passage of the main closure member out of the main seat takes place by pushing towards the main closure member.

10. Device forming a timer-operated tap or timer cartridge for a device forming a timer-operated tap according to claim 1, characterised in that the supply fluid is a hydraulic fluid.

11. Device forming a timer-operated tap or timer cartridge for a device forming a timer-operated tap, comprising at least one inlet opening for supply fluid and at least one outlet opening for supply fluid; a main closure member being capable of being received in a main seat formed in one of the at least one outlet or inlet openings to close the tap and of being removed from the main seat in order to open the tap and allow the passage of the supply fluid between the inlet and outlet openings; control means comprising a push element to control the movement of the main closure member by means of a control rod; and timer means disposed such that the main closure member is moved into the main seat at the end of a preset time interval, an element forming an intermediate closure member and an associated intermediate seat also being provided, and the arrangement of the device is such that when the intermediate closure member is in the intermediate seat, the main closure member is also in the main seat, and when the intermediate closure member is not in the intermediate seat, the main closure member is not in the main seat either.

12. Device forming a timer-operated tap or timer cartridge for a device forming a timer-operated tap according to claim 11, characterised in that the timer means comprise a main timer chamber that affects displacement of the control rod, the timer chamber being filled with a timer fluid.

13. Device forming a timer-operated tap or timer cartridge for a device forming a timer-operated tap according to claim 11, characterised in that the supply fluid is a hydraulic fluid.

14. Device forming a timer-operated tap or timer cartridge for a device forming a timer-operated tap according to claim 10, characterised in that the hydraulic fluid is water.

15. Device forming a timer-operated tap or timer cartridge for a device forming a timer-operated tap comprising at least one inlet opening for supply fluid and at least one outlet opening for supply fluid; a main closure member being capable of being received in a main seat formed in one of the at least one outlet or inlet openings to close the tap and of being removed from the main seat in order to open the tap and allow the passage of the supply fluid between the inlet and outlet openings; control means comprising a push element to control the movement of the main closure member by means of a control rod; and timer means disposed such that the main closure member is moved into the main seat at the end of a preset time interval, an element forming an intermediate closure member and an associated intermediate seat also being provided, and the intermediate closure member consists of a flexible membrane the actuating rod pushing the membrane into the intermediate seat so that the main closure member is also pushed into the main seat and the rod moves away from and leaves a mechanical connection with the membrane to release the membrane, causing the membrane to leave the intermediate seat and causing the main closure member to leave the main seat.

16. Device forming a timer-operated tap or timer cartridge for a device forming a timer-operated tap according to claim 15, characterised in that the membrane is made from an elastomer material.

* * * * *